US012226786B2

(12) United States Patent
Appel et al.

(10) Patent No.: US 12,226,786 B2

(45) Date of Patent: Feb. 18, 2025

(54) NOZZLE

(71) Applicant: Voith Patent GmbH, Heidenheim (DE)

(72) Inventors: Dominik Appel, Giengen (DE); Jose Luiz Campos Souza, Heidenheim (DE)

(73) Assignee: Voith Patent GmbH, Heidenheim (DE)

( * ) Notice: Subject to any disclaimer, the term of this patent is extended or adjusted under 35 U.S.C. 154(b) by 358 days.

(21) Appl. No.: 17/631,944

(22) PCT Filed: May 19, 2020

(86) PCT No.: PCT/EP2020/063885

§ 371 (c)(1),
(2) Date: Feb. 1, 2022

(87) PCT Pub. No.: WO2021/018433

PCT Pub. Date: Feb. 4, 2021

(65) Prior Publication Data

US 2022/0280954 A1 Sep. 8, 2022

(30) Foreign Application Priority Data

Aug. 1, 2019 (DE) ..................... 10 2019 120 809.2

(51) Int. Cl.
*B05B 1/08* (2006.01)
*B05B 1/26* (2006.01)
*B05B 15/658* (2018.01)
*B08B 3/02* (2006.01)
*D21F 3/10* (2006.01)

(52) U.S. Cl.
CPC ................ *B05B 1/08* (2013.01); *B05B 1/267* (2013.01); *B05B 15/658* (2018.02); *B08B 3/02* (2013.01); *D21F 3/10* (2013.01)

(58) Field of Classification Search
CPC ......... B05B 1/08; B05B 15/658; B05B 1/267; B08B 3/02; D21F 3/10
See application file for complete search history.

(56) References Cited

U.S. PATENT DOCUMENTS

| | | | | |
|---|---|---|---|---|
| 5,035,361 | A | 7/1991 | Stouffer | |
| 2012/0266376 | A1 | 10/2012 | Marty et al. | |
| 2018/0238032 | A1* | 8/2018 | Russell | B05B 1/14 |
| 2020/0376503 | A1* | 12/2020 | Wintering | B60S 1/52 |

FOREIGN PATENT DOCUMENTS

| | | | |
|---|---|---|---|
| CN | 102861679 | B | 7/2015 |
| DE | 102007037492 | A1 | 2/2009 |
| DE | 102008002259 | A1 | 12/2009 |
| DE | 102016208344 | A1 | 11/2017 |
| DE | 102017206849 | A1 | 10/2018 |
| EP | 0007950 | A1 | 2/1980 |
| EP | 1486158 | A1 | 12/2004 |

* cited by examiner

*Primary Examiner* — Jacob T Minskey
*Assistant Examiner* — Stephen M Russell
(74) *Attorney, Agent, or Firm* — Laurence A. Greenberg; Werner H. Stemer; Ralph E. Locher

(57) ABSTRACT

An oscillating nozzle, in particular for a cleaning device, includes a fluid oscillator having an oscillation chamber. The oscillating nozzle is configured in an angled manner, so that the plane of the fluid jet is deflected in the interior of the nozzle. The deflection occurs downstream of the oscillation chamber. A cleaning device and a suction roller are also provided.

20 Claims, 4 Drawing Sheets

Figure 1a (State of the Art)
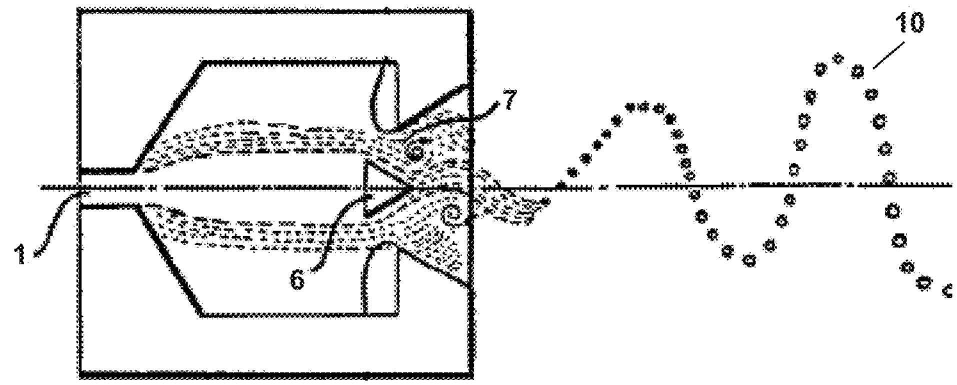
Figure 1b (State of the Art)
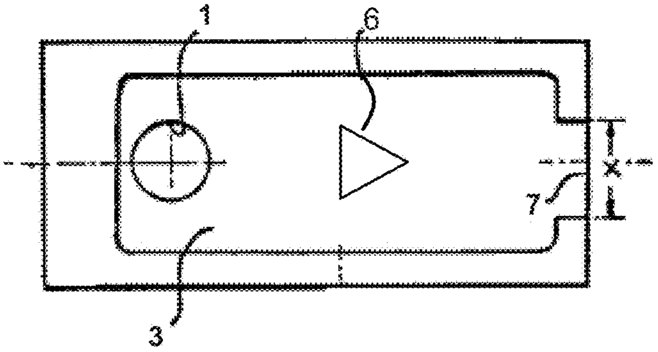
Figure 1c (State of the Art)
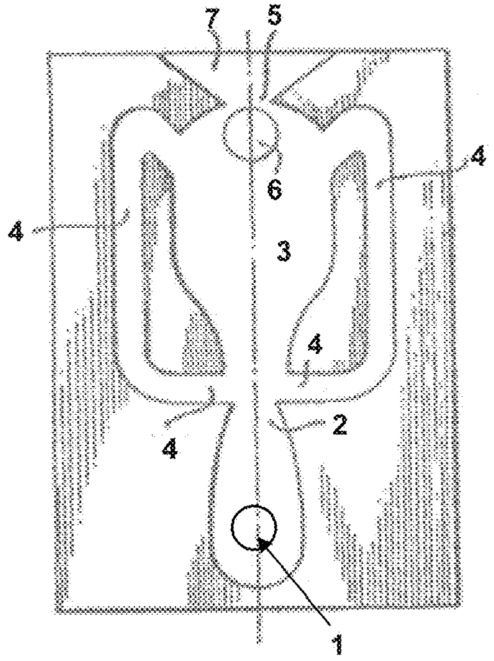

NOZZLE

FIELD AND BACKGROUND OF THE INVENTION

The invention relates to an oscillating nozzle, in particular for a cleaning device, including a fluid oscillator having an oscillation chamber, the oscillating nozzle configured to be angular so that a jet plane is deflected in an interior of the nozzle. The invention also relates to a cleaning device having an oscillating nozzle and to a suction roller having a cleaning device.

In the production of paper, cardboard or tissue products, and likewise in the production of non-woven products, suction rollers or else blower rollers are used at many locations. These rollers have a perforated roller casing. In the operation of suction rollers, negative pressure is then applied so that air/water or other fluid flows can be suctioned through the perforations of the roller casing. In an analogous manner, positive pressure is applied in the case of blower rollers so that a fluid flow is blown through the roller casing.

The fluid flows which pass through the perforations of the suction roller usually entrain a more or less heavy load of contamination. This here can be mineral substances such as, for example, limestone in the process water, or else mineral particles of filler material from the paper, or else fibers or fine material from the paper or the non-woven products, respectively. This load of contamination is successively deposited on the peripheries of the perforations and completely or partially blocks these perforations.

Even perforations of the roller casing that are only partially blocked lead to disruptions in the production process. The consequences here are heavily dependent on the task of the suction roller or blower roller, respectively. In the case of a suction roller for guiding or stabilizing the fibrous web, blocked perforations can lead to buffeting of the web, for example. In the case of suction press rollers, the dewatering performance drops. Quality parameters of the web, such as the transverse moisture profile, for example, can also be compromised in particular by a non-uniform contamination of the perforations in the transverse direction of the roller.

A potential remedy to this end is to subject the suction roller to cleaning at regular intervals. However, this is associated with downtime of the production plant, as well as with a complex disassembly and assembly of the roller, as a result of which high costs arise for the operator.

In the prior art, in particular in DE 10 2008 002 259, it has therefore been proposed that the suction roller is provided with a cleaning device. Here, a cleaning head is installed in the interior of the roller, said cleaning head having a number of nozzles from which a cleaning fluid that is pressurized to a certain level is sprayed through the perforations in order for the contamination is to be removed.

In the customary suction rollers in the paper and non-woven industry the individual perforations have a very small diameter of a few millimeters. Therefore, several hundred such bores are disposed across the width of a suction roller, said width potentially being 10 m or more, said bores moreover potentially being mutually offset in a so-called bore pattern. For technical and economic reasons, it is thus barely possible to use a single cleaning nozzle for each bore. DE 10 2008 002 259 solves this problem in that the cleaning head is embodied so as to be movable in the roller. By oscillating the cleaning had, a certain range of the width of the roller casing can be cleaned by a single nozzle.

In this solution it is however disadvantageous that the motion pattern for moving the cleaning head is in particular very complex and expensive. Moreover, the required mechanical and hydraulic components to a certain extent are always prone to defects and require regular maintenance.

Moreover, this cleaning system requires a comparatively large installation space. This leads to such a cleaning system not being able to be used in suction rollers with a small diameter.

SUMMARY OF THE INVENTION

It is therefore an object of the present invention to propose an improved nozzle which is also suitable for use in a cleaning system in a suction roller.

It is furthermore an object of the present invention to propose a cleaning system as well as a suction roller which overcome the problems of the prior art.

The objects are completely achieved by an oscillating nozzle according to the invention, as well as by a cleaning system according to the invention, and by a suction roller according to the invention. Advantageous embodiments are set forth in the dependent claims.

With a view to easier readability, aspects of the invention will be explained and claimed using the example of a suction roller. Unless explicitly described otherwise, blower rollers are always to be comprised here too.

In terms of the cleaning system, the object is achieved by a cleaning device, in particular for a suction roller, for a plant for producing or processing a fibrous web, wherein the cleaning device comprises a distribution line as well as a number of cleaning nozzles which by way of the distribution line are able to be supplied with a cleaning fluid. It is provided here that at least one cleaning nozzle, in particular all cleaning nozzles, is/are embodied as oscillating nozzle/nozzles.

Advantageous embodiments are described in the dependent claims.

It is obvious to the person skilled in the art that the cleaning nozzles in a cleaning device of this type have to be disposed such that the exiting fluid jet impacts the roller casing or the perforations, respectively.

Devices with the aid of which a fluid jet, that oscillates in a plane and thereby generates a fan-shaped pattern, can be generated have been known for a long time under the term of "fluid oscillator". Oscillators of this type are described in the European patent document EP 0 007 950 and the literature cited therein, for example. As opposed to a classic fan nozzle, the jet per se here is not fan-shaped but can be substantially punctiform. As a result of a suitable design of the nozzle geometry the jet can be brought to oscillate in a reciprocating manner. As is demonstrated by the embodiments in EP 0 007 950, which are yet to be discussed later, no movable parts whatsoever are required to this end, as a result of which the oscillator is subject to very little wear and maintenance.

Such fluid oscillators to date have been mainly used in sectors such as the automotive industry, for example. The company Bowles Fluidics (www.bowlesfluidic.com) markets oscillators of this type as a screen wash nozzle for headlamps and windshields, for example. The inventors have recognized that an oscillator of this type is surprisingly also suitable for use in cleaning suction rollers. It has been demonstrated here that such an oscillator has three characteristics which for the use in a cleaning device certain region of the roller casing—in particular in the CD direction—and as a result can clean a plurality of adjacent perforations. As opposed to the cleaning devices known from the prior art, this takes place without a mechanism or a hydraulic device being required for moving the nozzle. It has furthermore been demonstrated that the energy of the jet, or of the fluid, respectively, when impacting the roller casing is sufficiently high in order to achieve a sufficient cleaning effect. Finally, oscillators of this type can be made very compact. As a result, the installation size of the cleaning device can be kept significantly smaller than in the prior art. It is thus possible to satisfy a pre-existing requirement of the producers and to fabricate such cleaning devices also for suction rollers with very small diameters or a particularly small spacing between the suction box and the casing.

The oscillating nozzles are advantageously aligned such that the oscillation of the jet in all oscillating nozzles takes place in the same direction, or these directions differ only by less than 10°, respectively. When such a cleaning device is installed in a suction roller in a fibrous machine, or in or on another apparatus of the fibrous machine, respectively, this oscillation can advantageously take place in the CD direction.

The cleaning devices according to various aspects of the present invention as described are particularly suitable for cleaning suction rollers and blower rollers. Said cleaning devices can however likewise advantageously be used for cleaning or humidifying other parts of a paper machine or non-woven machine. The cleaning or conditioning of coverings, in particular screens or felts, is to be mentioned here as an example.

In preferred embodiments it can be provided that the jet exiting from the oscillating nozzles when oscillating sweeps an angle in the range between 90° and 170°, preferably between 110° and 130°, particularly preferably of 120°.

In one advantageous embodiment, a first quantity and a second quantity of oscillating nozzles can be provided in the cleaning device, wherein the exit angle of the jet plane of the first quantity and that of the second quantity are dissimilar. It can in particular be provided that one oscillating nozzle of the first quantity and one of the second quantity are in each case disposed in an alternating manner.

The advantage of dissimilarly directed jets is that said jets impact the roller casing at different circumferential positions. As a result, it is possible for adjacent cleaning nozzles to be fundamentally positioned next to one another at an arbitrary spacing without there being the risk of the exiting fluid jets crossing one another and as a result potentially reducing the cleaning effect, because the jet of the adjacent nozzle always impacts the roller casing in each case somewhat above or below. To this end, it has proven advantageous for the exit angle of the jet plane of the first quantity and that of the second quantity to differ by more than 2°, in particular by between 5° and 25°.

Depending on the application, even third, fourth, . . . etc., exit angles can be provided if required.

Unless otherwise described, the exit angle here is to be determined as the angle enclosed between the jet plane and the perpendicular.

In the oscillators known from the prior art the flow profile is straight, that is to say that the direction in which the fluid flows into the oscillator lies in the plane of the oscillating jet. Different exit angles of the jet plane by means of oscillators of this type can only be implemented in that the inflow direction is already correspondingly dissimilar.

The distribution line can advantageously be a cylindrical, or a substantially cylindrical, respectively, pipe. When the straight oscillators mentioned above are installed at different angles in the distribution line, the different exit angles can be implemented as a result.

An embodiment of this type can however lead to an increasing installation size of the cleaning device. Moreover, in terms of production technology it would be desirable for all cleaning nozzles to be able to be inserted in the distribution line in series and at the same angle.

It would thus be very desirable for the deflection of the jet plane to already take place in the nozzle per se. This, however, cannot be achieved by simply curving the known oscillator geometries because no oscillating jet would be able to be configured as a result.

In order for this problem to be solved, the known fluid oscillators have been improved by the inventors in such a manner that the jet plane is already deflected within the nozzle but the oscillating jet is nevertheless preserved. These angular oscillating nozzles per se are already a further invention and will be described in more detail in the further course of the application.

In terms of the cleaning device it can be advantageous, as has already been mentioned above, for at least some, in particular all, oscillating nozzles to be embodied so as to be angular such that the jet plane is deflected in the interior of the nozzle.

It may arise, for example as a result of contaminations in the cleaning fluid, that the cleaning nozzles, in particular the oscillating cleaning nozzles, per se get blocked after some time. Moreover, damage to the cleaning nozzles can also arise as a result of wear during operation. As opposed to the complicated maintenance of the cleaning device described in the prior art, the cleaning nozzles in the cleaning device according to one aspect of the invention can simply be replaced. The replacement of the cleaning nozzles can take place in a particularly simple manner when the cleaning nozzles are connected to the distribution line by way of a releasable connection, in particular a screw connection or a plug connection.

In one advantageous embodiment, the cleaning nozzles are attached next to one another on the distribution line, wherein the spacing between two adjacent cleaning nozzles is advantageously less than 500 mm, for example between 150 mm and 350 mm. This can be advantageous when not all nozzles are uniformly spaced apart. For achieving a uniform cleaning effect it can be particularly advantageous for the nozzles to be disposed in groups of two, and for the spacing $I_A$ of the nozzles in a group of two to be less than the spacing $I_B$ from the next group of two. Details to this end will be further explained by means of the figures. Alternatively however, it can also be expedient for the cleaning nozzles to be provided uniformly along the distribution line.

In terms of the suction roller, the object is achieved by a suction roller for a plant for producing or processing fibrous web, wherein the suction roller comprises at least one cleaning device according to one aspect of the invention.

While the cleaning device can in principle also be attached outside the suction roller, it is in most instances advantageous for the cleaning device to be disposed in the interior of the suction roller.

If the cleaning device is disposed in the interior of a suction roller, the width of the range swept by the oscillating jet of a nozzle is a function of the oscillation angle θW and the spacing of the oscillating nozzle from the casing of the suction roller. This width is determined by the formula:

$$b_S = 2l_d \tan\frac{\theta W}{2}$$

It is advantageous for an oscillating nozzle of a quantity (for example of the first quantity or the second quantity) to be spaced apart from the next nozzle of this quantity by this spacing bs or more, in order to avoid the oscillating jets being influenced by the jets of the adjacent nozzles.

The invention furthermore comprises a method for cleaning a suction roller according to one aspect of the invention.

The cleaning device here can be impinged with a fluid, in particular splash water, wherein the fluid has a pressure of less than 40 bar, in particular less than 10 bar, preferably of between 1 and 5 bar.

At pressures above 40 bar the material of the cleaning device is very heavily stressed, this resulting in more rapid wear. In many cases however, a sufficient cleaning effect can also be achieved at a lower pressure, especially also between 1 bar and 5 bar.

It can furthermore be advantageous for less than 20 l/min/m, in particular between 9 l/min/m and 11 l/min/m to be used for cleaning. This low water consumption is desirable in economic and ecological terms and at the same time enables a good cleaning effect.

However, it may also be helpful for cleaning to take place using larger quantities of fluid, for example 30 l/min/m, 40 l/min/m, or else more, especially when higher fluid pressures are being used.

The described cleaning method can be performed either continuously during the operation of the suction roller or only at discrete cleaning intervals which may also be during a machine downtime.

As has already been mentioned above, the angular oscillating nozzles represent a further invention, said angular oscillating nozzles being able to be used for a cleaning device according to one aspect of the previous invention, but also being suitable for a multiplicity of other applications.

Proceeding from the known fluid oscillators, for example of EP 0 007 950, it is an object of the further invention to specify an oscillator, in particular an oscillating nozzle, in which the direction of the fluid entering the oscillator does not lie in the plane of the oscillating jet.

This object is achieved by an oscillating nozzle, in particular for a cleaning device as described above, wherein the oscillating nozzle comprises a fluid oscillator and the oscillating nozzle is embodied so as to be angular such that the jet plane is deflected in the interior of the nozzle, characterized in that the deflection takes place after the fluid oscillator.

Advantageous embodiments are described in the dependent claims.

The fluid oscillator in the angular nozzle after the oscillator inlet often comprises an oscillation chamber and in most instances one or two return flow ducts. The oscillation of the fluid jet is initiated by the shape and arrangement of said return flow ducts, the fluid jet then exiting the fluid oscillator again at an outlet. While oscillators designed in such a manner are advantageous, the invention is however not limited thereto.

Experiments with a view to angling the nozzle in the region of the oscillator often fail because the configuration of the oscillation is prevented or impeded, respectively, as a result. The inventors thus consider the angulation after the exit of the oscillator to be advantageous.

In one advantageous embodiment, the nozzle geometry is designed such that the fluid after the oscillation chamber is guided by way of at least two ducts separated by an island. This region is referred to as the overrun region. The deflection of the jet plane preferably takes place in this overrun region. The ducts can advantageously be symmetrical. It can also be advantageous for the width of the ducts to be constant, or at least largely constant, across the profile of the ducts. This here is in particular to be understood such that the duct width in the initial region and final region may deviate from the width in the remaining region. Such an embodiment has proven to be very advantageous because a very wide range of angles can be implemented in this way without in so doing compromising the effect of the oscillator.

The inventors have discovered that providing an overrun region and positioning the deflection in this overrun region is particularly advantageous. Despite the complicated internal structure of the oscillator, or of the entire flow chamber, respectively, nozzles of the type described can indeed be produced in a very simple and cost-effective manner by additive methods (3D-printing). The nozzles here can be produced from a multiplicity of materials, for example metals and/or polymer materials. One disadvantage in such additively manufactured nozzles is however that the internal faces of the flow chamber in most instances have a comparatively high degree of roughness and a post-treatment in the interior of the nozzle is only possible with difficulty, if at all. This internal roughness leads to a majority of the fluid being dispensed in the region of the reversal points of the oscillating jet when a nozzle without an overrun region is used. This results in only limited opening angles being able to be implemented in practice, as sufficient fluid is otherwise no longer dispensed in the regions between the reversal points. As a result of the downstream overrun region, preferably in the annular shape described, a noticeable homogenization in terms of the dispensation of fluid can be achieved.

Moreover, it has been surprisingly demonstrated that the nozzle in this overrun region can be angled in a wide angular range without the configuration of the oscillation being compromised as a result.

In particularly advantageous embodiments here it can be provided that the jet plane is deflected by an angle between 1° and 90°, in particular between 5° and 45°.

It can furthermore be advantageous for at least one lip to be provided at the exit from the oscillating nozzle, after the outlet opening, so as to prevent the jet from being widened perpendicularly to the jet plane. It can be particularly advantageous for two lips to be provided. As a result, the widening of the jet toward the top as well as the bottom can be prevented.

The length of the lip can advantageously be at least three times the width of the oscillator inlet.

While it is obvious to a person skilled in the art from what has been mentioned above, it is to be explained once again at this point that the term “interior of the nozzle”, thus the region in which the deflection of the jet plane takes place, refers to the region between the inlet, in particular between the oscillator inlet and the outlet opening. This is where the flow chamber having the oscillator and the overrun region is situated. Potentially provided lips accordingly are not part of the interior of the nozzle.

The lip, or the lips, respectively, is/are usually not angled or curved, respectively, but embodied so as to be straight. Angling or curving the lips for deflecting the jet is also not necessary because the angling takes place already in the interior of the nozzle.

Nevertheless, in some cases it may be expedient for an additional curvature, or an additional angulation, respectively, to be provided in the region of the lips. Embodiments of this type are also comprised by the present invention.

In preferred embodiments it can be provided that the exiting jet sweeps an angle in the range between 90° and 170°, preferably between 110° and 130°, particularly preferably of 120°.

Depending on the desired application or availability, the angular oscillating nozzle can be produced from a multiplicity of materials. The latter include metals such as steel, aluminum, etc., as well as plastics materials such as, for example, a polyamide, in particular PA12, or a polyethylene.

In preferred embodiments the nozzle can be embodied so as to be integral.

A further great advantage is that these nozzles can also be produced by means of additive methods.

Further advantageous developments of the invention will be explained by means of exemplary embodiments with reference to the drawings. The features mentioned can be advantageously implemented not only in the combination illustrated but can also be combined individually with one another.

BRIEF DESCRIPTION OF THE FIGURES

FIGS. 1*a*, 1*b* and 1*c* show examples of the fluid oscillators from the prior art.

DETAILED DESCRIPTION OF THE INVENTION

Figure 2:
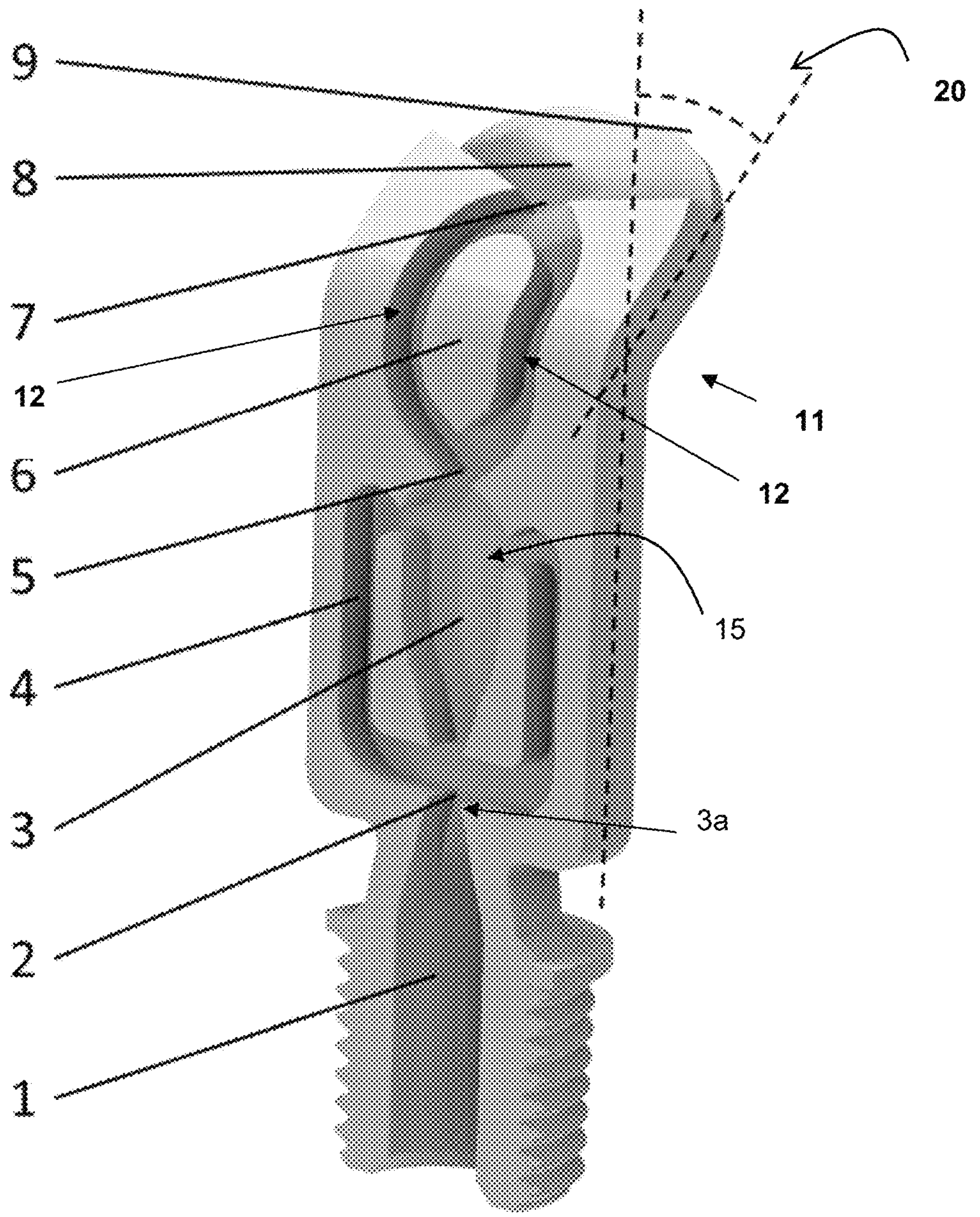
FIG. 2 schematically shows a section through the construction of an angular oscillating nozzle according to one aspect of the invention.

FIGS. 1*a*, 1*b* and 1*c* schematically show different design embodiments of fluid oscillators as are known from t prior art. These fluid oscillators are suitable for use in oscillating nozzles 20 according to different aspects of the present invention. However, the present inventions are not limited to these embodiments of the fluid oscillators. In general, all types of fluid oscillators are suitable.

The fluid can enter the flow chamber through an inlet 1. An acceleration nozzle, for example in the form of a constriction, can optionally be provided, as is shown in FIG. 1*c*. The fluid thereafter enters the oscillation chamber 3. Depending on the type of the oscillator, flow obstacles 6 in the form of islands 6 can be provided in the oscillation chamber 3. Alternatively or additionally, return flow ducts 4 which return parts of the flow of fluid back in the direction of the inlet 1 can also be provided. At the outlet 7 the fluid exits the oscillator as an oscillating jet 10.

In the embodiment in FIG. 1*a*, the flow runs straight through the oscillator, that is to say that the direction of the inflow into the inlet 1 lies in the plane of the oscillating jet 10. In the embodiments as per FIGS. 1*b* and 1*c* the flow inlet 1 is illustrated from below. A deflection of the flow takes place ahead of the actual oscillator.

FIG. 2 shows an angular oscillating nozzle 20 according to one aspect of the invention. In this embodiment, the fluid is directed into the nozzle 20 by way of an inlet 1. While not mandatory, the fluid is then advantageously directed through an acceleration nozzle 2 into the oscillator chamber 3 by way of the oscillator inlet 3*a*. An oscillator which comprises two return flow ducts 4 is illustrated in FIG. 2. The nozzle in FIG. 2 has a constriction 5 at the location where the outlet 7 is disposed in the known oscillators. Thereafter, the fluid is directed through two ducts 12 which are separated by an island 6. It is very advantageous for the ducts and the island 6 to have a high degree of symmetry. The island 6 can in particular be embodied so as to be circular, elliptic, teardrop-shaped or similar.

The ducts 12 are converged again behind the island 6, and the fluid as an oscillating jet subsequently exits the nozzle 20 by way of an outlet 7. The region between the constriction 5 and the outlet 7 is referred to as the overrun region 11. The overrun region 11, conjointly with the oscillator, here forms the interior of the nozzle 20. In order to achieve that the oscillating jet 10 and the inflow direction do not lie in the same plane, the oscillating nozzle 20 is embodied so as to be angular. In order for the effect of the oscillator not to be disturbed, the nozzle 20 is angled by an exit angle within the overrun region. This exit angle can advantageously be between 1° and 90°, in particular between 5° and 45°. An angle of 30° is illustrated in an exemplary manner in FIG. 2.

In order to avoid that the oscillating jet 10 is widened after the outlet 7, a lip 8 is provided in the nozzle 20 in FIG. 2. This lip 8 prevents the downward evasion by the jet 20. Alternatively or additionally it can be provided that a lip 8 which prevents the upward evasion by the jet is provided. The lip 8, or lips 8, respectively, are not angled or curved, respectively, in FIG. 2 but embodied so as to be straight. Angling or curving the lips 8 is also not necessary for deflecting the jet because the angling takes place already prior thereto in the interior of the nozzle 20. Nevertheless, in some cases it may be expedient for an additional curvature, or an additional angulation, respectively, to be provided in the region of the lips 8.

Such an angular oscillating nozzle 20 can be used for a multiplicity of applications. Said angular oscillating nozzle 20 is extremely suitable for the use as an oscillating nozzle 20 in a cleaning device 100 according to one aspect of the invention.

Figure 3:
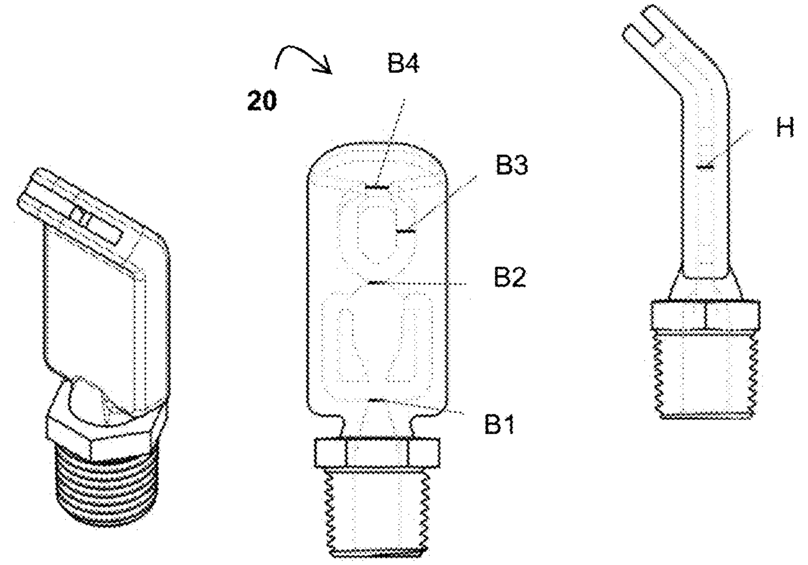
FIG. 3 schematically shows views of an angular oscillating nozzle according to one aspect of the invention.

An angular oscillating nozzle 20 according to one aspect of the invention is again illustrated in various views from the outside in FIG. 3. The profile of the internal flow chambers is plotted as a dashed line. B1 here refers to the inlet width after the acceleration nozzle 2; B2 refers to the width of the constriction 5; B3 refers to the width of the ducts 12; and B4 refers to the width of the outlet 7. These four widths B1-B4 in conjunction with the length of the lip 8 influence the development of the oscillating jet 10. A jet propagation of 120° in the jet plane, this having been demonstrated as very advantageous, can be achieved, for example, when the widths B1 and B2, thus the inlet width and the width of the construction, are identical. The width of the ducts as well as of the outlet opening may be somewhat wider than the inlet width B1.

Particularly advantageous here is the combination:

$$B2=B1$$

$$B3=1.25*B1$$

$$B4=1.5*B1$$

The absolute values for these widths of course depend heavily on the application and the desired flow rates. For an application as an oscillating nozzle 20 in a cleaning device 100 according to one aspect of the invention, the width B1 can be chosen for example between 1 mm and 5 mm, in particular as 2 mm.

The geometry of the flow chambers advantageously is consistent across the entire height of said flow chambers. In the embodiment in FIG. 2 the height H is chosen so as to be equal to the inlet width B1. This results in a square cross section of the inlet 1.

The length of the lip 8 can advantageously be at least three times the inlet width B1. This is advantageous with a view to achieving a jet 20 bundled in the direction of the normal.

A very advantageous embodiment of the oscillating nozzle thus has the following dimensions:

| B1 | B2 | B3 | B4 | H | Lip |
|---|---|---|---|---|---|
| 2 mm | 2 mm | 2.5 mm | 3 mm | 2 mm | ≥6 mm |

The nozzles 20 shown in FIGS. 2 and 3 at the base have in each case a thread. This is advantageous with a view to connecting to a fluid supply line. Alternatively, this connection can also be performed for example by way of a plug connection. A simple replacement of the nozzles 20 is possible in both cases. Depending on the applications, however, other types of connections, in particular also non-releasable connections, to the fluid line may be provided.

Figure 4:
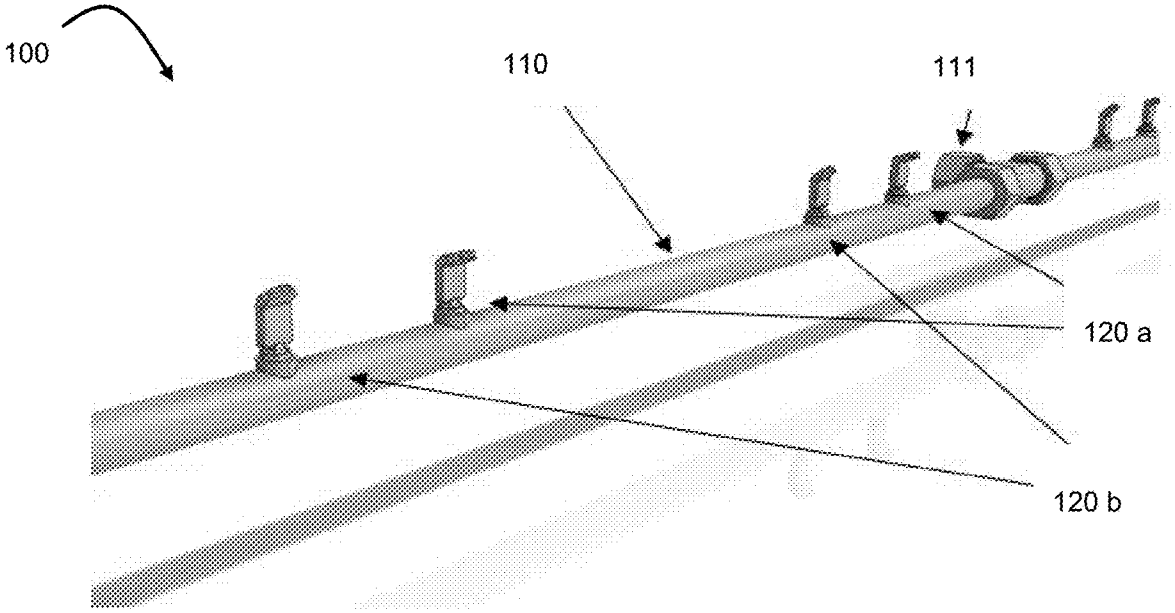
FIG. 4 schematically shows a fragment of a cleaning device according to another aspect of the invention.

FIG. 4 shows a fragment of a cleaning device 100 according to one aspect of the invention. Such a cleaning device 100 can in particular be used as a cleaning device 100 for a suction roller 130 for a plant for producing or processing a fibrous web. A multiplicity of cleaning nozzles 120*a*, 120*b* are attached to a distribution line 110 which can be embodied as a distributor pipe 110. These cleaning nozzles 120*a*, 120*b* can be supplied with a cleaning fluid such as, for example, splash water, by the distribution line 110. The cleaning fluid can be supplied by way of a single fluid connector 111 or by way of a plurality of fluid connectors 111 of the distribution line 110. All cleaning nozzles in FIG. 4 are embodied as oscillating nozzles 20. It is particularly advantageous for the cleaning nozzles to be designed as angular oscillating nozzles 20, for example such as are described in FIGS. 2 and 3. The embodiment in FIG. 4 has a first quantity 120*a* and a second quantity 120*b* of angular cleaning nozzles, wherein the exit angle of the jet plane of the first quantity 120*a* and that of the second quantity 120*b* are dissimilar. A difference of 5°-10° in the angles is often advantageous. It can thus be provided, for example, that the exit angle of the first quantity 120*a* is 30° and the exit angle of the second quantity 120*b* is 35°.

It is advantageous for the spacing between two adjacent cleaning nozzles to be between 150 mm and 350 mm. A cleaning device 100 in which the mutual spacing of the cleaning nozzles is variable is illustrated in FIG. 4. The cleaning nozzles here are positioned for example in groups of two composed of a nozzle of the first quantity and a nozzle of the second quantity, for example. This can be advantageous as will be explained below by means of FIG. 5*c*.

Alternatively, the spacing of adjacent cleaning nozzles may also be identical, for example 250 mm. However, it can be also provided, for example, that in regions where contamination is less likely, for example on the periphery of a suction roller 130, larger spacings between the cleaning nozzles are provided than in the other regions.

Figure 5A:
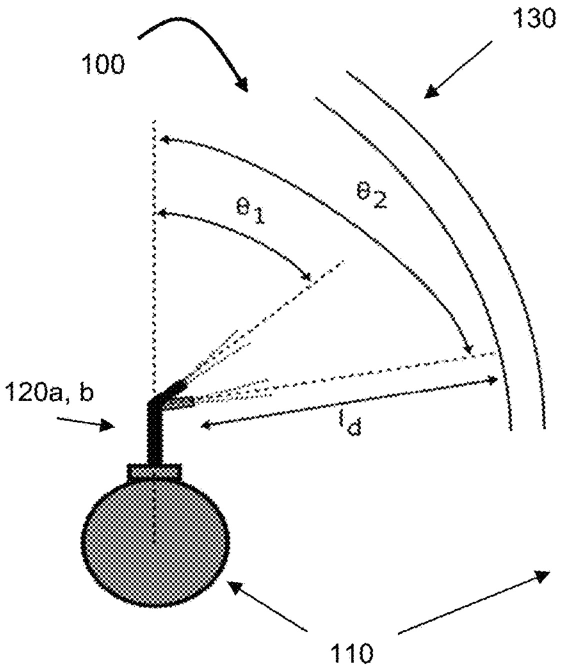
FIGS. 5*a*, 5*b* and 5*c* show details pertaining to a cleaning device according to one aspect of the invention.
Figure 5B:
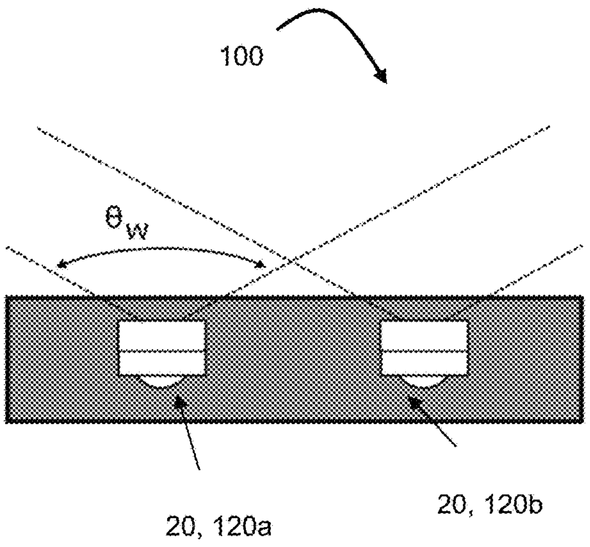
Figure 5C:
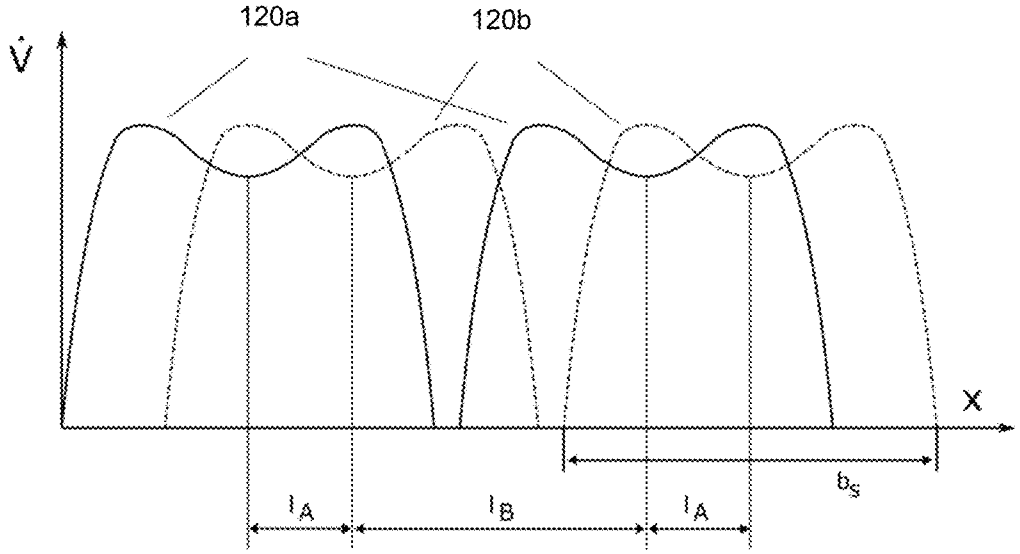

A potential method for positioning the cleaning nozzles in a cleaning device according to one aspect of the invention is to be explained by means of FIGS. 5*a*, 5*b* and 5*c*. The installed situation of a cleaning device 100 in a suction roller

130 is illustrated in FIG. 5*a*. The distribution line 110 here runs parallel, or at least largely parallel, to the axis of the suction roller 130. The cleaning device 100 comprises, for example, a first quantity 120*a* and a second quantity 120*b* of angular oscillating nozzles 20 which are disposed in an alternating manner. The respective exit angles are provided with the reference signs θ1 and θ2. The spacing of the cleaning device 100 from the casing of the suction roller 130 (measured from the exit point of the jet from the nozzle) is $I_d$. FIG. 5*b* shows a device as in FIG. 5*a* in a plan view. To be seen here is the oscillation angle θW, thus the angle which is swept by the oscillating jet 10 when oscillating. This oscillation angle can be between 90° and 170°, for example. As can be seen in FIG. 5*b*, the nozzles 20 can be disposed such that the regions in which the jets 10 oscillate overlap in the case of adjacent nozzles. In this instance it is advantageous for respective adjacent nozzles 20, 120*a*, 120*b* to have different exit angles θ1, θ2. As a result, the jet planes of adjacent nozzles lie in space such that the jets to not contact one another and thus do not interfere with one another. As can be seen in FIG. 5*a*, the jet of the first quantity θ1 impacts the casing of the suction roller 130 above the jet of the second quantity θ2.

FIG. 5*c* illustrates why overlapping of adjacent jet regions according to one aspect of the invention is not only possible without problems but indeed advantageous. The graph shows the volumetric flow of fluid of four adjacent oscillating nozzles 20. A typical "M profile" can be seen here, meaning that less fluid per unit of time impacts the suction roller 130 in the center of the swept region than toward the peripheries. This is generally typical of oscillators. As described, the distribution of the fluid can be homogenized by using an overrun region 11, as a result of which wider oscillation angles θW, or larger swept regions bs become possible, respectively. As a result, the cleaning device 100 can be implemented with fewer nozzles 20. It can be seen that the nozzles of the first quantity 120*a* are positioned such that the jets of said nozzles do not contact one another. The nozzles of the second quantity 120*b* now can be positioned such that the regions with a high volumetric flow of the fluid are where there is a smaller impact of the volumetric flow of the nozzles of the first quantity 120*a*, and vice versa. It can thus be achieved that the casing of the suction roller 130, or else other moving areas to be cleaned or to be humidified, respectively, are on average impinged uniformly with fluid across the width.

The variable bs in FIG. 5*c* moreover describes the width of the region swept by the oscillating jet 10. With the aid of the oscillation angle θW and the spacing of the oscillating nozzle 20 from the casing of the suction roller 120, this width is derived from $$b_S = 2l_d \tan\frac{\theta W}{2}$$

It has proven advantageous for the cleaning nozzles, as is illustrated in FIG. 4, to be positioned in groups of two composed of a nozzle of the first and of the second quantity. These two nozzles of one group have the spacing $I_A$, while the spacing from the first nozzles of the next group of two is $I_B$. Here, it preferably applies that $I_A$=0.25 bs, and $I_B$=0.75 bs. This results in particularly homogenous cleaning of the suction roller 130. In more general terms, the spacings should be chosen as:

$$l_A \in [0.2, 0.3] b_S; l_B \in [0.7, 0.8] b_S$$

LIST OF REFERENCE SIGNS

1: Inlet
2: Acceleration nozzle
3: Oscillation chamber
3*a*: Oscillator inlet
4: Return flow ducts
5: Constriction
6: Island
7: Outlet opening
8: Lip
9: Exit angle
10: Oscillating jet
11: Overrun region
12: Duct
15: Flow chamber
20: Oscillating nozzle
100: Cleaning device
110: Distribution line
111: Fluid connector
120*a*: First quantity
120*b*: Second quantity
130: Suction roller
B1: Inlet width
B2: Width of the constriction
B3: Width of the ducts
B4: Width of the outlet opening
H: Height of the flow chamber
θ1, θ2 Exit angles
θW Oscillation angle

The invention claimed is:

1. An oscillating nozzle for ejecting a fluid jet or an oscillating nozzle for ejecting a fluid jet in a cleaning device, the oscillating nozzle comprising:
- a fluid oscillator having an oscillation chamber;
- a nozzle interior being angled for deflecting the fluid jet along a jet plane in said nozzle interior downstream of said oscillation chamber; and
- an overrun region disposed downstream of said oscillation chamber, said overrun region being defined by defined by two ducts for guiding a fluid stream and an island separating said two ducts, said island defining a portion of duct walls of said two ducts, said jet plane being deflected in said overrun region.

2. The oscillating nozzle according to claim 1, wherein said jet plane is deflected by an angle of between 1° and 90°.

3. The oscillating nozzle according to claim 1, wherein said jet plane is deflected by an angle of between 5° and 45°.

4. An oscillating nozzle for ejecting a fluid jet or an oscillating nozzle for ejecting a fluid jet in a cleaning device, the oscillating nozzle comprising:
- a fluid oscillator having an oscillation chamber; and a nozzle interior being angled for deflecting the fluid jet along a jet plane in said nozzle interior downstream of said oscillation chamber;
- an exit of the oscillating nozzle, and at least one lip disposed at said exit for preventing the fluid jet from widening perpendicularly to said jet plane.

5. The oscillating nozzle according to claim 1, wherein said fluid jet oscillates and sweeps an oscillation angle in a range of between 90° and 170°.

6. The oscillating nozzle according to claim 1, wherein said fluid jet oscillates and sweeps an oscillation angle of about 120°.

7. The oscillating nozzle according to claim 1, wherein the nozzle is completely or partially composed of a metal or a plastics material.

8. The oscillating nozzle according to claim 1, wherein the nozzle is constructed to be integral or in one piece.

9. A cleaning device able to clean a suction roller for a plant for producing or processing a fibrous web, the cleaning device comprising:
- a distribution line; and
- a plurality of cleaning nozzles configured to be supplied with a cleaning fluid by said distribution line and to eject a fluid jet;
- at least one or each of said plurality of cleaning nozzles being an oscillating nozzle according to claim 1.

10. The cleaning device according to claim 7, wherein said plurality of cleaning nozzles includes a first quantity and a second quantity of oscillating nozzles each having a jet plane exit angle, and said jet plane exit angles of said first quantity of cleaning nozzles and of said second quantity of cleaning nozzles are different.

11. The cleaning device according to claim 10, wherein one oscillating nozzle of said first quantity of cleaning nozzles and one oscillating nozzle of said second quantity of cleaning nozzles are disposed in an alternating manner.

12. The cleaning device according to claim 10, wherein said jet plane exit angle of said first quantity of cleaning nozzles and said jet plane exit angle of said second quantity of cleaning nozzles differ by more than 2°.

13. The cleaning device according to claim 10, wherein said jet plane exit angle of said first quantity of cleaning nozzles and said jet plane exit angle of said second quantity of cleaning nozzles differ by between 5° and 25°.

14. The cleaning device according to claim 9, which further comprises a releasable connection, a screw connection or a plug connection connecting said plurality of cleaning nozzles to said distribution line.

15. The cleaning device according to claim 9, wherein said plurality of cleaning nozzles are disposed at a mutual spacing of less than 500 mm.

16. The cleaning device according to claim 9, wherein said plurality of cleaning nozzles are disposed at a mutual spacing of between 150 mm and 350 mm.

17. A suction roller for a plant for producing or processing a fibrous web, the suction roller comprising at least one cleaning device according to claim 9.

18. The suction roller according to claim 17, wherein the cleaning device is disposed in an interior of the suction roller.

19. The oscillating nozzle according to claim 4 further comprising an inlet have a width, said lip having a length that is at least three times said width of said inlet.

20. The oscillating nozzle according to claim 4 wherein said lip has a length that is at least 6 mm.

* * * * *